United States Patent
Vaddi et al.

(10) Patent No.: US 11,307,839 B2
(45) Date of Patent: Apr. 19, 2022

(54) UPDATING OF CONTAINER-BASED APPLICATIONS

(71) Applicant: Hewlett Packard Enterprise Development LP, Houston, TX (US)

(72) Inventors: Kiran Kumar Vaddi, Karnataka (IN); Om Kumar, Karnataka (IN); Lokesh Shivashankara, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 14 days.

(21) Appl. No.: 16/453,665

(22) Filed: Jun. 26, 2019

(65) Prior Publication Data

US 2020/0409680 A1    Dec. 31, 2020

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
None
See application file for complete search history.

(56) References Cited

U.S. PATENT DOCUMENTS

| 2008/0016504 A1* | 1/2008 | Cheng ................. G06F 8/65 717/168 |
| 2016/0182315 A1* | 6/2016 | Salokanto ........... H04L 41/5054 709/226 |
| 2017/0180346 A1 | 6/2017 | Suarez et al. |
| 2017/0264684 A1 | 9/2017 | Spillane et al. |
| 2017/0269921 A1* | 9/2017 | Martin Vicente ......... G06F 8/61 |
| 2019/0235897 A1* | 8/2019 | Goel .................... G06F 9/45545 |
| 2020/0394120 A1* | 12/2020 | Fathi Salmi ........ G06F 11/3688 |

FOREIGN PATENT DOCUMENTS

| CN | 105630488 A | 6/2016 |
| CN | 106873975 A | 6/2017 |

OTHER PUBLICATIONS

Clay Smith, "Automating Docker Image Builds With Continuous Integration", (webpage), available online at <https://blog.newrelic.com/engineering/docker-images-continuous-integration/>, Sep. 21, 2016, 6 pages.
Twain Taylor, "How to Start Docker Containers Automatically", (webpage), available online at <https://codeburst.io/how-to-start-docker-containers-automatically-ec0545c392e4>, Jan. 2016, 5 pages.
NPM, "Supervisor", Webpage, Oct. 14, 2016, 4 pages, retrieved from Internet Archive <https://web.archive.org/web/20161014074122/https://www.npmjs.com/package/supervisor>.
Pallets Team, "Quickstart", Webpage, 17 pages, Jun. 24, 2019, retrieved from Internet Archive https://web.archive.org/web/20190624001121/http://flask.pocoo.org/docs/1.0/quickstart/.
Remy, "nodemon", GitHub, May 28, 2019, 9 pages, retrieved from Internet Archive <https://web.archive.org/web/20190528075002/https://github.com/remy/nodemon>.

\* cited by examiner

*Primary Examiner* — Marina Lee
(74) *Attorney, Agent, or Firm* — Jaffery Watson Mendonsa & Hamilton

(57) ABSTRACT

Example techniques for updating of container-based applications are described. In an example, a second version of an application code or application code changes are retrieved from a code storage location. Based on the retrieved second version or the retrieved application code changes, an application hosted in a container is updated.

15 Claims, 5 Drawing Sheets

UPDATING OF CONTAINER-BASED APPLICATIONS

BACKGROUND

An application may refer to a program or a group of programs designed to perform a function or a group of coordinated functions for a user. The application may be hosted in a container, which may be a computing instance that can host the application and can operate as a separate computer from the point of view of the application. An application hosted in a container may be referred to as a container-based application. An application code corresponding to the application may be updated frequently, for example, during a development phase of the application. Upon updating, the application may have to be tested to ensure that the application functions in an expected manner.

BRIEF DESCRIPTION OF DRAWINGS

The following detailed description references the figures, wherein.

DETAILED DESCRIPTION

Figure 1:
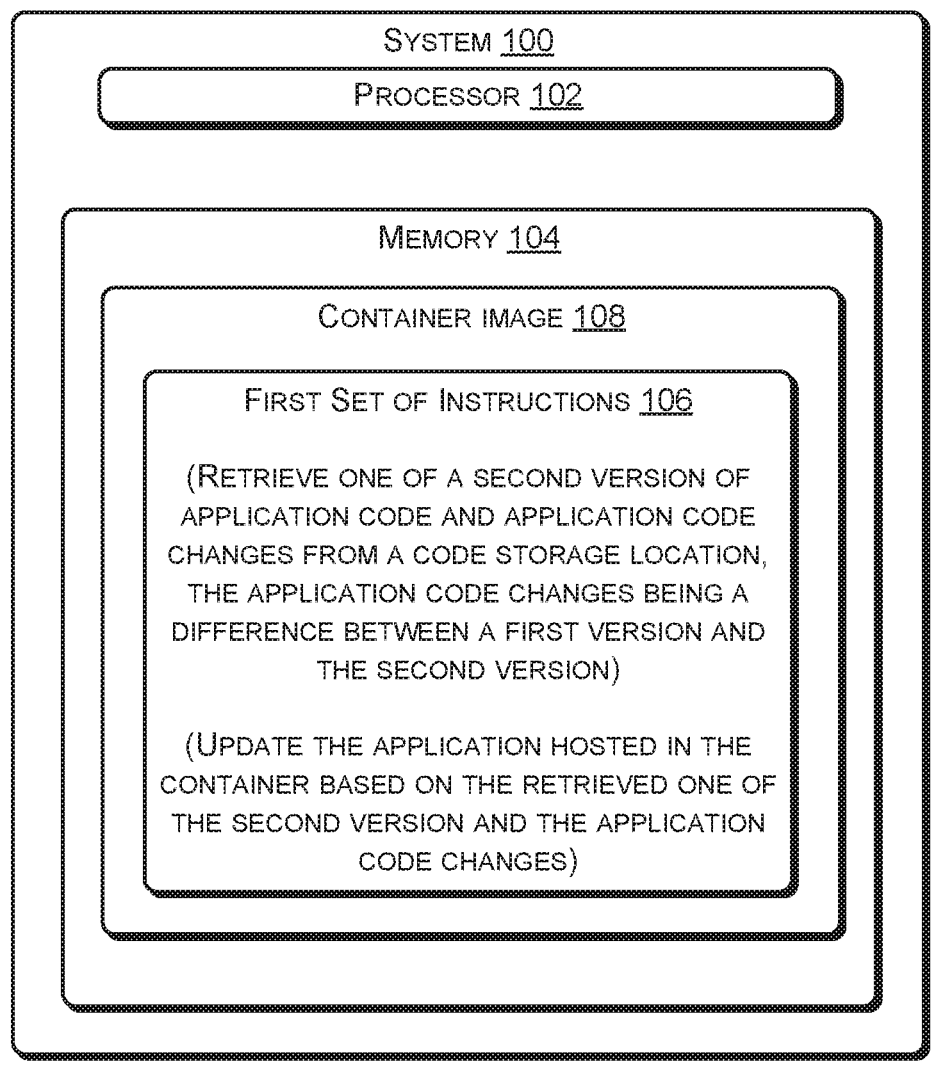
FIG. 1 illustrates a system for updating a container-based application, according to an example implementation of the present subject matter.

A container may isolate an application running in the container from a computing node the container is hosted in and from other containers hosted in the computing node. The container may provide a consistent runtime environment to the application regardless of the computing node it is hosted in. The container may provide, among other things, application code, system tools, system libraries, and settings to the application. To host the application in the container, generally, a container image having the application code, system tools, system libraries, settings, and the like is created. The running of the container image causes instantiation of the container. The instantiated container hosts the application. An application hosted in a container may be referred to as a container-based application.

Sometimes, an application may have to be updated. For instance, during development of the application, a developer of the application may frequently change the application code corresponding to the application. Upon running an executable form of the changed application code, the application gets updated. The updated application may have to be tested, for example, to ensure that the updated application performs in a manner expected by the developer.

Generally, to test a container-based application after it is updated, an updated container image is created based on the modified application code. The updated container image may then have to be run to instantiate a new container. Such a procedure is to be repeated regardless of the amount of changes made to the application code. For instance, even for minor changes to the application code, a new container image is to be built and a new container is to be instantiated based on the new container image. This may increase the time taken for testing the changes.

Further, in some cases, the development and testing of the container-based applications may be performed in separate computing devices. For instance, the developer may write the application code in his/her computing device and the testing may be performed in another computing device that is part of a cluster of computing devices. Further, transfer of container images between the developer and the cluster of computing devices may be mediated by a container image repository, which acts as a repository of different versions of the container image. Accordingly, for each update to the container image, the container image is to be uploaded to the container image repository and is to be pulled into the cluster of computing devices from the container image repository. Accordingly, even for minor changes to the application code, a significant amount of network resources is expended on uploading and pulling the container images, which tend to be large in size.

The present subject matter relates to updating of container-based applications. With the implementations of the present subject matter, changes to application code corresponding to container-based application can be tested with minimal expenditure of time and network resources.

In accordance with an example implementation, a container may be hosted in a system and an application may be hosted in the container. The application may correspond to a first version of an application code, also referred to as a first version. For instance, the application may be hosted by running an executable form of the first version of the application code in the container.

In an example, a second version of the application code, also referred to as a second version, may be retrieved from a code storage location. The second version of the application code may include some changes as compared to the first version of the application code. A difference between the first version and the second version may be referred to as application code changes. In another example, instead of the second version, the application code changes alone may be retrieved. Based on a retrieved entity, i.e., the application code changes or the second version, whichever is retrieved, the application hosted in the container may be updated. For instance, the second version of the application code may be built to update the application. Accordingly, the container, which hosted an earlier version of the application, may host an updated version of the application.

The retrieval and the update, as explained above, may be performed by the system by executing a first set of instructions. The first set of instructions may enable detecting updates to the application code in the code storage location, for example, by periodic polling, by continuous polling, or upon receiving an update notification. In an example, the first set of instructions may be part of a container image, from which the container can be instantiated. In the container image, the first set of instructions may be provided in the form of a script.

Since the application is updated in a running container based on changes to the application code, the present subject matter prevents creation of a new container image based on the changes to the application code and instantiating a new container from the new container image. Therefore, the time consumed for testing the changes to the application code can be significantly reduced. Further, since the new container image is not to be transmitted for updating changes to the application code, the present subject matter significantly reduces the amount of data transferred across a network. For instance, for testing the changes to the application code, a new container image having the changed application code is not to be transmitted. Rather, the updated application code or the changes alone is to be transmitted to the code storage location. Thus, the present subject matter reduces the amount of network resources consumed for testing the changes to application code.

Further, the inclusion of the instructions to retrieve application code/application code changes and update the application are provided as part of a container image provides an improved container image for testing purposes. Such a container image can be used in any computing environment that is used to test changes to application code.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates a system 100 for updating a container-based application, according to an example implementation of the present subject matter. A container-based application may refer to an application hosted in a container. In an example, the system 100 may be implemented as a computing device, such as a desktop computer, a laptop computer, a server, and the like. In another example, the system 100 may be implemented as a plurality of computing devices. The plurality of computing devices may be or may include a cluster of computing nodes. A computing node may be a computing device or a virtual machine (VM) hosted in a computing device. The cluster of computing nodes, interchangeably referred to as the cluster, may refer to computing nodes which have their resources, such as storage, processor, and memory, managed together. The system 100 includes a processor 102 and a memory 104 coupled to the processor 102.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions included in the memory 104. The computer-readable instructions, hereinafter referred to as instructions, include a first set of instructions 106. The functions of the processor 102 may be provided through the use of dedicated hardware as well as hardware capable of executing machine readable instructions. In an example, the first set of instructions 106 may be part of a container image 108, from which a container (not shown in FIG. 1) can be instantiated. The container image 108 may be stored in the memory 104.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, the system 100 may instantiate the container from the container image 108. Further, an application may be hosted in the container. The application may correspond to a first version of an application code, interchangeably referred to as a first version. An application is said to correspond to a version of an application code if the application is a running instance of the version of the application code. The application may correspond to a version of the application code if, for example, the application is hosted by running an executable form of the version of the application code. An executable form of the version of the application code may be obtained by building the application code.

When the first set of instructions 106 is executed, in an example, a second version of the application code may be retrieved from a code storage location. The second version of the application code may be interchangeably referred to as the second version. The second version may be an updated version of the application code. For instance, after developing the first version, a developer of the application code may make a few changes to the first version, such as by adding a few lines of code and/or removing a few lines of code. The changed application code may be referred to as the second version. A difference between the first version and the second version may be referred to as application code changes. For instance, the application code changes may include the added lines of code and may indicate the removed lines of code. In another example, when the first set of instructions 106 is executed, instead of the second version, the application code changes may be retrieved from the code storage location.

Upon retrieving one of the second version and the application code changes, the application hosted in the container may be updated based on the second version or the application code changes, whichever is retrieved. The updating of the application based on the second version may involve running of an executable form of the second version in the container. If the application code changes are received, the update of the application based on the application code changes may involve generating the second version using the first version and the application code changes. Subsequently, the executable form of the second version may be generated and run in the container. Accordingly, regardless of whether the second version is retrieved or the application code changes are retrieved, the application hosted in the container is updated such that the application corresponds to the second version. The actions performed by the instructions 106 will be explained in greater detail with reference to FIGS. 2 and 3.

Figure 2:
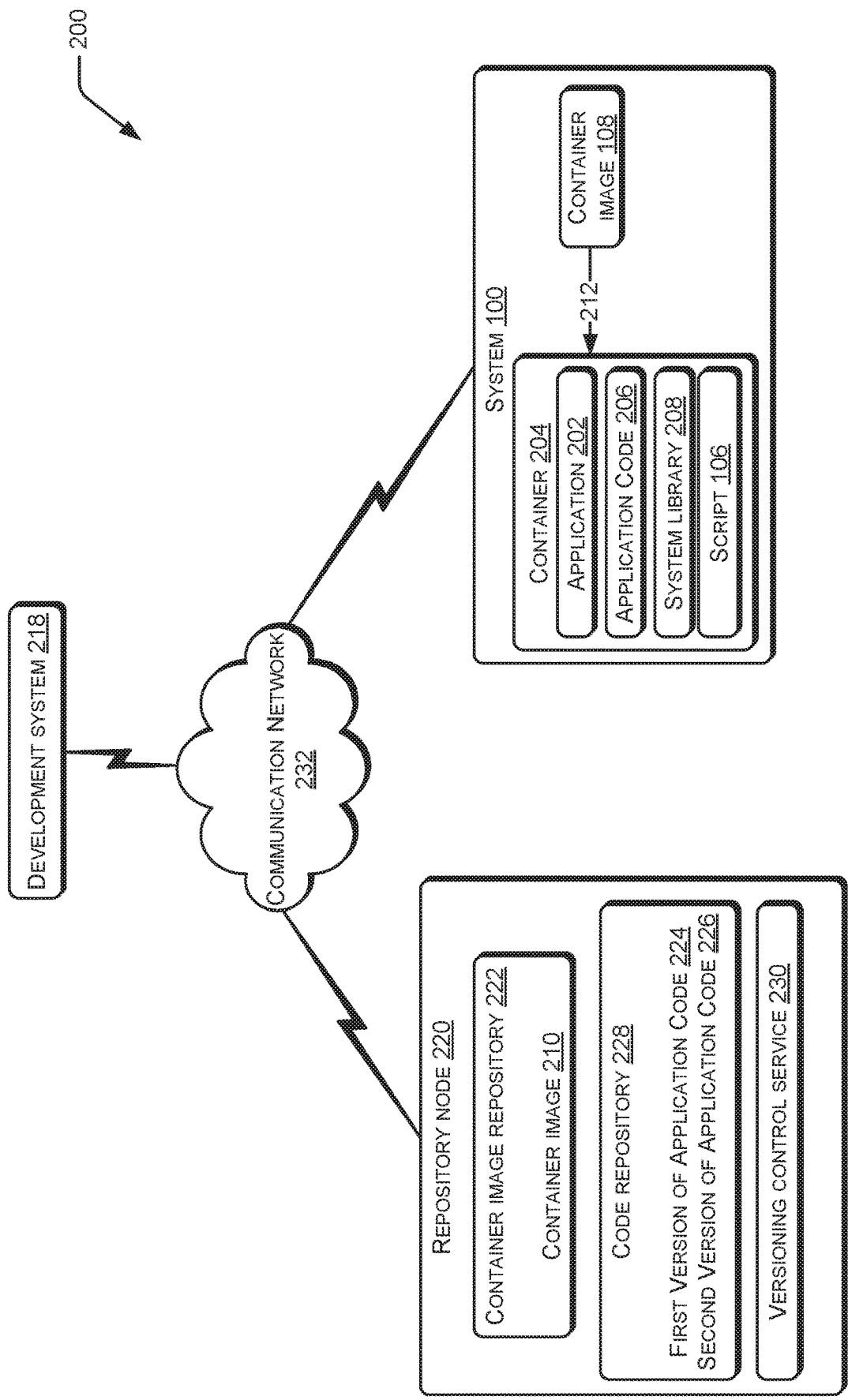
FIG. 2 illustrates a computing environment in which a container-based application is updated, according to an example implementation of the present subject matter.

FIG. 2 illustrates a computing environment 200 in which a container-based application is updated, according to an example implementation of the present subject matter. An application may refer to a program or a group of programs designed to perform a function or a group of coordinated functions for a user. The application may be hosted in a container. A container may refer to a computing instance that can host an application and operates as a separate computer from the point of view of the application. For instance, the container can isolate the application running within itself from a computing node the container is hosted in and from other containers hosted in the computing node. The container may provide, among other things, application code, system tools, system libraries, and settings to the application. Further, the container can provide a consistent runtime environment to the application regardless of the computing node it is hosted in. An application hosted in a container may be referred to as a container-based application.

An example of the container-based application is an application 202, which is hosted in a container 204. As illustrated, the container 204 may have an application code 206 and a system library 208 corresponding to the application 202. The container 204 may be instantiated from the container image 108, which may be a blueprint for the container 204. Thus, the container 204 may be a running instance of the container image 108. The instantiation of the container 204 from the container image 108 is illustrated by the arrow 212. In an example, the container image 108 may be, for example, a Docker image and the container 204 may be a Docker container.

The container 204 may be hosted in the system 100. When the system 100 is implemented as a cluster of computing nodes or includes a cluster of computing nodes, several computing nodes of the cluster may be hosting containers, each of which, in turn, may host an application. The containers in the cluster may be coordinated by an orchestration platform, such as Kubernetes®. When the orchestration platform is Kubernetes®, the cluster may be referred to as a Kubernetes® cluster.

In an example, the system 100 may be utilized for testing container-based applications during development of such applications. The testing performed during the development phase may be referred to as development testing. For instance, a developer may write an application code corresponding to a container-based application, such as the application 202, in a computing system 218, which may also be referred to as a development system 218. Subsequently, a container image, such as the container image 108, having the written application code may be created in the development system 218. The container image may then be transferred to a repository node 220 for storage in a container image repository 222. The repository node 220 may be, for example, a fileserver, a node having a versioning control service running thereon, or the like.

From the container image repository 222, the container image may be pulled by the system 100. Thereafter, the container image may be run in the system 100, causing the container, such as the container 204, to be hosted in the system 100. Since the container image is bundled with the application code written by the developer, the running of the container image causes the application, such as the application 202, to be hosted in the container 204. The developer may monitor the running application to ascertain whether the application is running in an expected manner.

In some cases, the application code with which the developer created the container image may be frequently modified. For instance, after creating the container image 108, the developer may further modify the application code 206. Accordingly, the application code with which the container image 108 was created may be referred to as a first version 224 of the application code 206, also referred to as the first version 224. After developing the first version 224, the developer may revise the application code 206 and develop a second version 226 of the application code 206, also referred to as the second version 226. The developer may have to test the second version 226, for example, to ensure that the modifications produce the intended result. In such cases, conventionally, the developer may have to create a new container image with the modified application code. The new container image may then have to be uploaded to the container image repository 222, from which the new container image is to be pulled into the system 100 and rerun, as explained above. The present subject matter prevents repetition of a cycle of recreating container image, uploading the container image, pulling in the container image, and running the container image for changes in the application code.

In accordance with the present subject matter, upon development of a first version 224 and creation of the container image 108 based on the first version 224, if the developer revises the application code 206 and develops the second version 226, a new container image is not to be built. Instead, the developer may upload the second version 226 to the repository node 220. In an example, a plurality of versions of the application code 206 may be stored in a code repository 228 in the repository node 220. In an example, instead of storing the plurality of versions of the application code 206, the code repository 228 may store the first version 224 and changes made to the application code 206 during each revision of the application code 206. Accordingly, from the first version 224 and a first set of revisions to the application code 206, the second version 226 may be generated. The code repository 228 may be managed by a versioning control service 230, such as GitHub.

Even though the second version 226 is uploaded to the repository node 220, the application 202 hosted in the container 204 still corresponds to the first version 224, as the application 202 is hosted by running the first version 224. To test the second version 226, the present subject matter enables updating the application 202 based on the second version 226. The updating of the application 202 is facilitated by the instructions 106. In an example, the instructions 106 may be provided in the form of a script, and may be referred to as the script 106. The script 106 may be provided in the container image 108. Accordingly, the script 106 is part of the container 204 as well, as illustrated.

During the running of the container 204, and during running of the application 202 in the container 204, the script 106 may also be executed. On execution of the script 106, the system 100 may retrieve the second version 226 from the code repository 228. To facilitate retrieval from the code repository 228, the script 106 may specify location of the code repository 228. The location may include, for example, an Internet Protocol (IP) address of the repository node 220. Instead of the second version 226, the system 100 may retrieve the revisions made to the first version 224 by the developer to arrive at the second version 226. The revisions made to the first version 224 to arrive at the second version 226 may be referred to as application code changes. In an example, the script 106 may specify whether to retrieve the second version 226 or the application code changes.

In an example, the system 100 may store the retrieved information, i.e., the second version 226 or the application code changes, inside the container 204, such as in a host volume (not shown in FIG. 2) in the container 204. The information that is retrieved on execution of the script 106 may be referred to as application code information. Accordingly, the application code information may be either the second version 226 or the application code changes. In another example, the system 100 may store the retrieved information outside of the container 204, but in a location in the system 100 that is accessible to the container 204, and from which the container 204 can pull in information. In such a case, the retrieval may include storage of the retrieved information in the external location. The location from which the container 204 can pull in information may be, for example, a persistent volume (PV) or hostpath associated with the container 204 (not shown in FIG. 2). If the application code changes alone are retrieved, the system 100 may generate the second version 226 from the first version 224 and the application code changes. The generation of the second version 226 may be performed by the script 106 or by another set of instructions.

Upon retrieval of the application code information, the system 100 may also update the application 202 running in the container 204 based on the application code information. In an example, to update the application 202, first, the system 100 may build the second version 226. If the application code information is the application code changes, the second version 226 may be generated from the first version 224 and the application code changes. The building may involve converting the second version 226 into a form that can be executed by the system 100. The conversion of the second version 226 may include, for example, compilation of the second version. Upon building the second version 226, the application 202 may be restarted. The restarting may involve running the second version 226. Accordingly, upon restarting of the application 202, the application 202 is updated. The updated application 202 now corresponds to the second version 226. In an example, the update of the application 202 may involve restarting the container 204. The container 204 may be restarted, for example, in cases where the application code information is stored in a location external to the container 204. In such cases, the restarting of the container 204 enables pulling in the application code information from the external location.

In an example, the steps to be performed to update the application 202, such as stopping the container 204, building the second version 226, restarting the application 202, and restarting the container 204, may be specified in the script 106. The specification of various details to be used for updating the application 202 in the script 106 ensures that a complete update of the application 202 may be achieved by executing the script 106 alone. Therefore, the script 106 acts as a self-sufficient package for updating applications for testing application code changes.

Although the code repository 228 and the container image repository 222 are both explained as being part of the same node, in some cases, the node storing the code repository 228 may be different from the node storing the container image repository 222. Further, although the application code information is explained as being retrieved from a repository (i.e., the code repository 228) that is outside of the system 100 in response to execution of the script 106, in some cases, in response to execution of the script 106, the application code information may be retrieved from a location in the system 100. The location from which the information is retrieved in response to execution of the script 106 may be referred to as a code storage location. The retrieval in a case when the code storage location is in the system 100 will be explained with reference to FIG. 3.

In an example, to facilitate communication of data, the system 100, the development system 218, and the repository node 220 may be connected by a communication network 232. The communication network 232 may be a wireless or a wired network, or a combination thereof. The communication network 232 may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 232 includes various network entities, such as transceivers, gateways, and routers.

Figure 3:
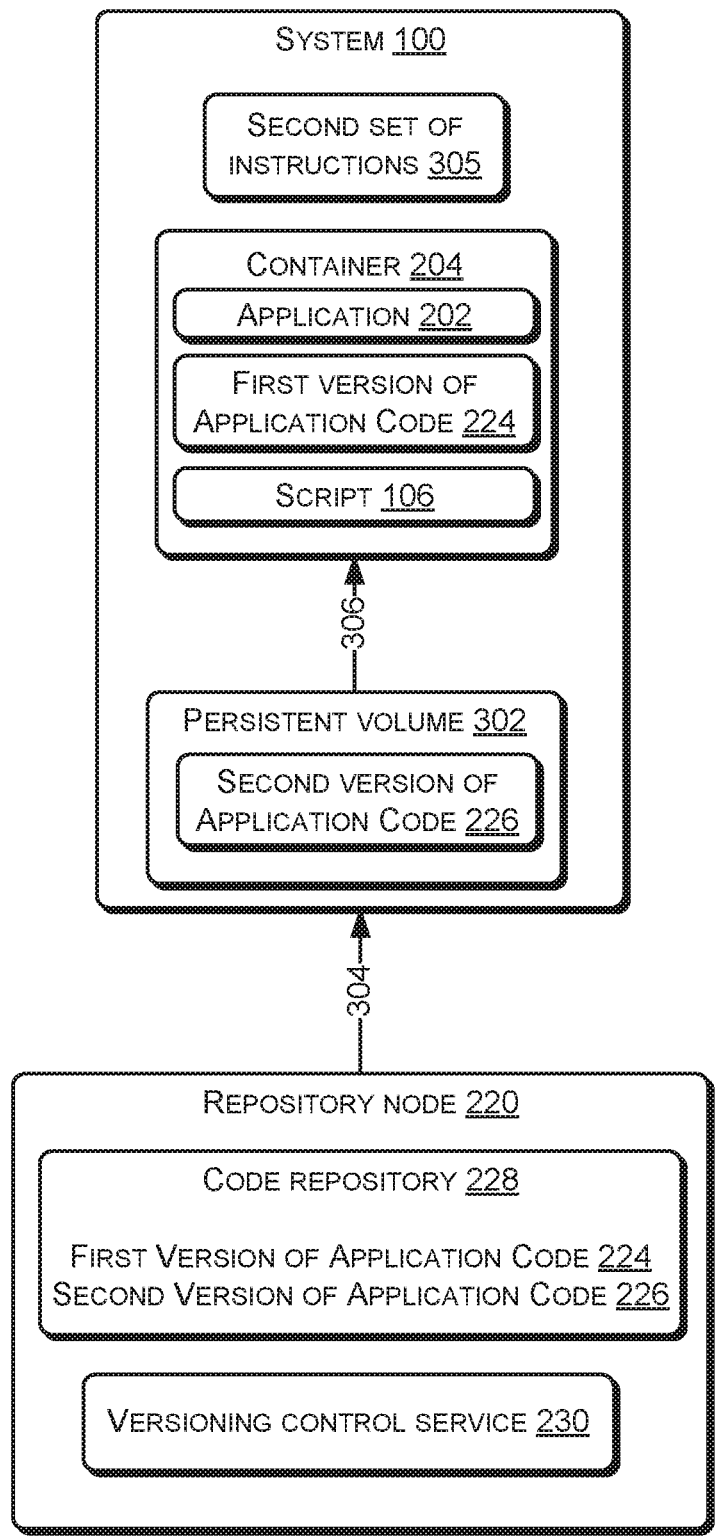
FIG. 3 illustrates updating of an application by a script when a code storage location is internal to a system, according to an example implementation of the present subject matter.

FIG. 3 illustrates updating of the application 202 by the script 106 when the system 100 incudes the code storage location, according to an example implementation of the present subject matter. The code storage location may be a location in the system 100 from which the container 204 can pull in data. In an example, the code storage location may be a persistent volume (PV) 302 associated with the container 204.

In an example, the second version 226 may be transferred from the code repository 228 to the code storage location, as indicated by an arrow 304. Instead of the second version 226, the application code changes alone may be transferred to the code storage location. The second version 226 or the application code changes may be transferred to the code storage location in response to a request by the system 100 to the repository node 220. The system 100 may send the request when a second set of instructions 305 is executed. The second set of instructions 305 also cause storage of the second version 226 or the application code changes in the code storage location. Subsequently, in response to execution of the script 106, the application code information, i.e., the second version 226 or the application code changes, may be retrieved from the code storage location. The retrieval may involve pulling in the application code information inside the container 204, as illustrated by an arrow 306. In an example, to retrieve the application code information, the container 204 may be restarted.

Whether the code storage location is part of the system 100, as explained with reference to FIG. 3, or outside the system 100, as explained with reference to FIG. 2, the retrieval of the application code information from the code storage location may be initiated in response to detection of updates to the code storage location. Similarly, when the code storage location is part of the system 100, the system 100 may send the request to the repository node 220 on detection of updates to the code repository 228. In an example, the detection of updates may be performed based on a polling of the code storage location. For instance, the system 100 may periodically or continuously poll the code storage location for updates to the application code 206. If the code storage location is the code repository 228, which is outside the system 100, the system 100 may check for updates by periodically polling the repository node 220. The system 100 may detect the updates to the code storage location based on receipt of an update notification as well. For instance, if code storage location is the code repository 228, the system 100 may detect that the code storage location is updated on receiving an update notification from the repository node 220. In an example, to send the update notification, the repository node 220 may utilize a webhook for which the script 106 is an endpoint. Accordingly, once the developer uploads a newer version of the application code 206 to the repository node 220, the repository node 220 may invoke the webhook to notify the script 106 of the uploading.

Upon retrieval of the application code information, the application 202 may be updated in the manner as explained with reference to FIG. 2. Upon updating of the application 202, since the application 202 corresponds to the second version 226, the developer may test the application 202. For instance, the developer may monitor the working of the application 202, and ensure that the application 202 performs in an intended manner. If the application 202 does not perform in the intended manner, the developer may, for example, undo the application code changes or may develop a third version of the application code 206 to be tested. The third version may also be tested using the container 204. For instance, the application 202 may be updated such that the application 202 corresponds to the third version. Accordingly, the container 204 may be used to test a plurality of versions of the application code 206 before deploying the application 202 in a production environment.

It may be noted that, according to the present subject matter, the testing of the application 202 can be performed without recreating container images. For instance, a new container image having the second version 226 is not created. Further, it may also be noted that the second version 226 is hosted in an already-running container, i.e., the container 204, without instantiation of a new container based on a newly created container image. Therefore, the present subject matter eliminates recreation of container image and instantiation of a new container from the new container image for each application code change to be tested. Therefore, the present subject matter significantly reduces the time consumed in testing application code changes. The reduction of time and network resources consumed for testing application code changes is more pronounced in cases where the development of the application may involve creation and testing of several versions of the application code.

In an example, upon completion of testing, and after the developer arrives at a final version of the application code 206, based on which the application 202 is to be deployed in the production environment, a finalized container image may be created. The finalized container image may be used to instantiate a container in the production environment. Accordingly, the final container image may be referred to as a production container image, and the container instantiated from the production container image may be referred to as a production container. The production container image may include the finalized version of the application code. Further, the production container image may exclude the script 106, as retrieval of application code information and updating of the application 202 in a running container may not have to be performed in the production environment. The production container image may be created, for example, by the system 100 upon receiving an instruction from the developer. For creating the production container image, the system 100 may utilize a third set of instructions (not shown in FIGS. 1-3).

Figure 4:
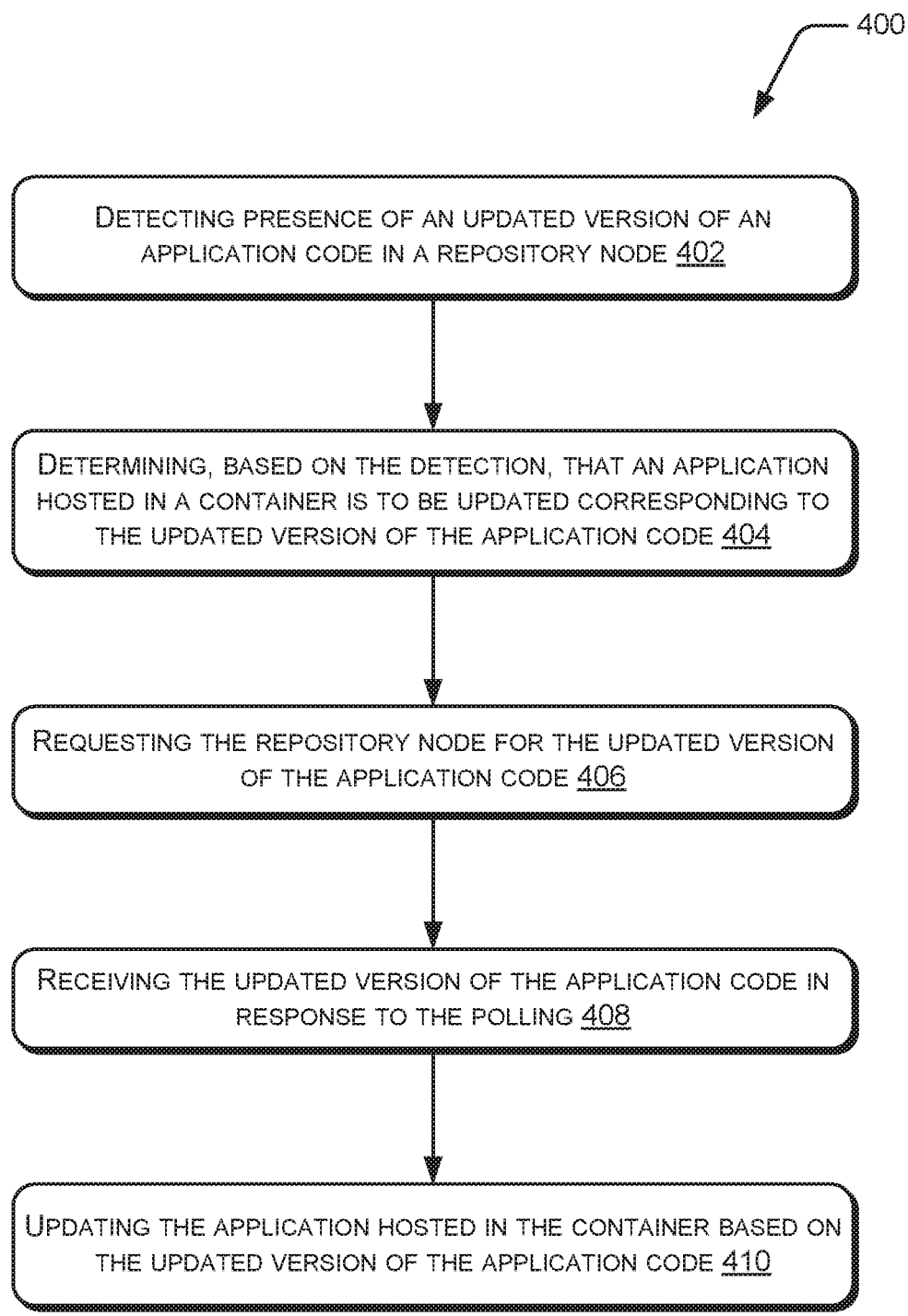
FIG. 4 illustrates a method for updating a container-based application, according to an example implementation of the present subject matter.

FIG. 4 illustrates a method 400 for updating a container-based application, according to an example implementation of the present subject matter.

The order in which the method 400 is described is not intended to be construed as a limitation, and any number of the described method blocks may be combined in any order to implement the method 400, or an alternative method. Furthermore, the method 400 may be implemented by processing resource(s) or computing device(s) through any suitable hardware, non-transitory machine-readable instructions, or a combination thereof.

It may be understood that steps of the method 400 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. Further, although the method 400 may be implemented in a variety of systems, the method 400 is described in relation to the aforementioned system 100, for ease of explanation. In an example, the method 400 may be performed by a processing resource, such as the processor 102.

At block 402, presence of an updated version of an application code in a repository node is detected. The repository node may be, for example, the repository node 220. The repository node may include a code repository, such as code repository 228, that can store a plurality of versions of the application code. The updated version of the application code includes updates over a previous version of the application code. The updated version of the application code may be, for example, the second version 226 of the application code 206 and the previous version of the application code may be the first version 224 of the application code 206.

In an example, the presence of the updated version may be detected based on a polling of the repository node. For instance, the repository node may be polled periodically or continuously for updates. In another example, the presence of the updated version may be detected in response to receipt of an update notification from the repository node. The update notification may be sent by the repository node by invoking a webhook, as explained earlier. In a further example, presence of the updated version may be detected based on both the polling and the change notification.

At block 404, based on the detection, it is determined that an application hosted in a container is to be updated corresponding to the updated version of the application code. The application may be, for example, the application 202, the container may be, for example, the container 204.

At block 406, the repository node is requested for the updated version of the application code. At block 408, the updated version of the application code is received in response to the request. Further, at block 410, the application hosted in the container is updated based on the updated version of the application code. For instance, prior to the updating, the application hosted in the container may correspond to the previous version of the application code and, upon the updating, the application may correspond to the updated version. For example, as explained earlier, in response to receiving the second version 226, the application 202 hosted in the container 204 is updated such that the application 202 corresponds to the second version 226.

In an example, the updating may include restarting of the application. In another example, the updating may include restarting the container. In a further example, the updating may include restarting of both the application and the container.

In an example, the steps at blocks 402-410 may be performed in response to execution of a set of instructions in a container image from which the container is instantiated. The container image may be, for example, the container image 108. The set of instructions may be, for example, the first set of instructions 106.

In an example, upon generation of a final version of the application code corresponding to a final version of the application that is to be deployed on a production environment, the method 400 may include creation of a production container image. The production container image corresponds to a production container to be deployed in the production environment. The production container image includes the application code corresponding to the final version of the application.

Figure 5:
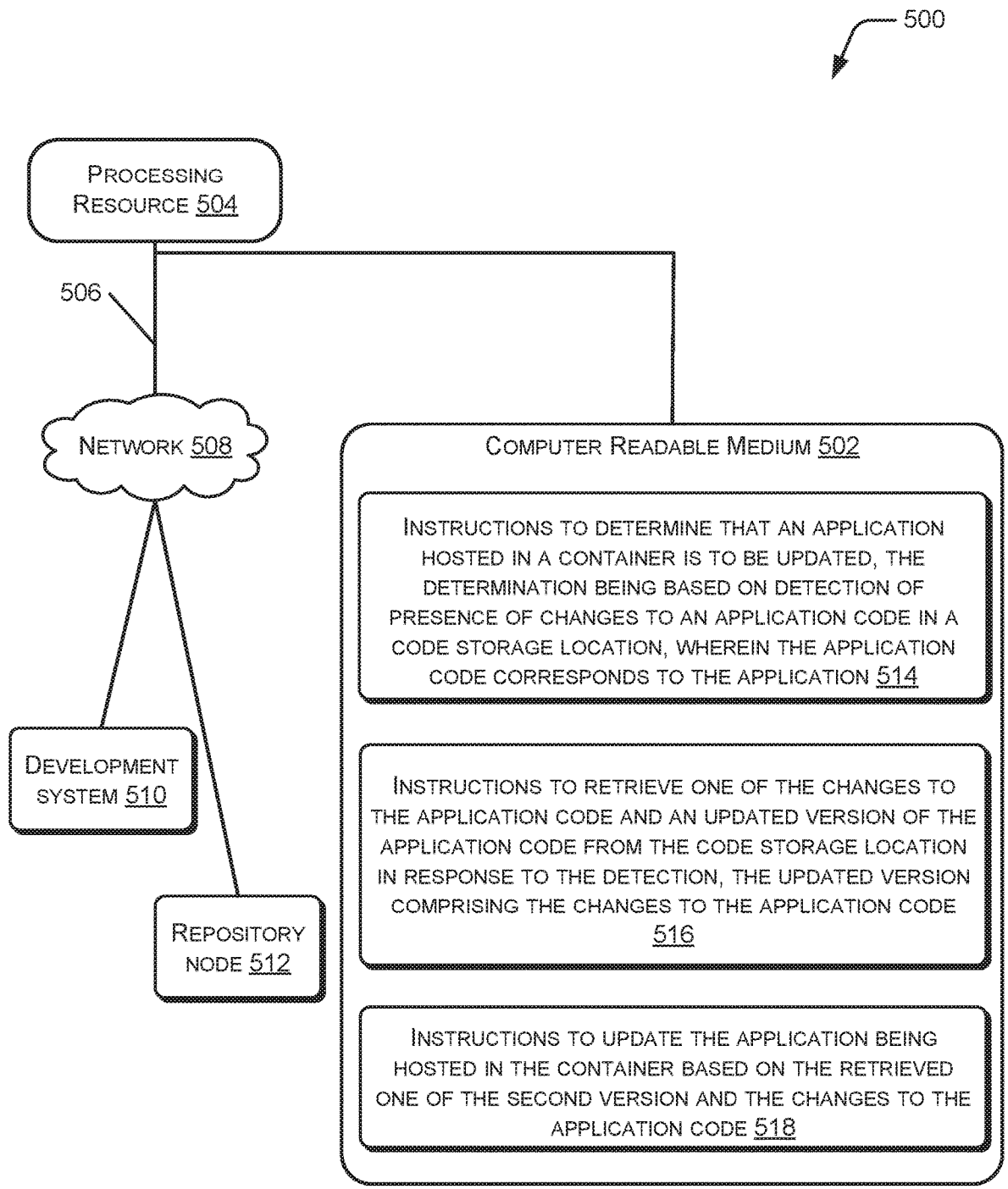
FIG. 5 illustrates a computing environment implementing a non-transitory computer-readable medium for updating container-based applications, according to an example implementation of the present subject matter.

FIG. 5 illustrates a computing environment 500 implementing a non-transitory computer-readable medium 502 for updating container-based applications, according to an example implementation of the present subject matter.

In an example, the non-transitory computer-readable medium 502 may be utilized by a system, such as the system 100. The system 100 may be implemented in a public networking environment or a private networking environment. In an example, the computing environment 500 may include a processing resource 504 communicatively coupled to the non-transitory computer-readable medium 502 through a communication link 506.

In an example, the processing resource 504 may be implemented in a system, such as the system 100. The processing resource 504 may be the processor 102. The non-transitory computer-readable medium 502 may be, for example, an internal memory device or an external memory device. In one implementation, the communication link 506 may be a direct communication link, such as any memory read/write interface. In another implementation, the communication link 506 may be an indirect communication link, such as a network interface. In such a case, the processing resource 504 may access the non-transitory computer-readable medium 502 through a network 508. The network 508 may be a single network or a combination of multiple networks and may use a variety of different communication protocols.

The processing resource 504 and the non-transitory computer-readable medium 502 may also be communicatively coupled to a development system 510 and a repository node 512 over the network 508. The development system 510 may be, for example, the development system 218 and the repository node 512 may be, for example, and the repository node 220.

In an example implementation, the non-transitory computer-readable medium 502 includes a set of computer-readable instructions to update container-based applications. The set of computer-readable instructions can be accessed by the processing resource 504 through the communication link 506 and subsequently executed.

Referring to FIG. 5, in an example, the non-transitory computer-readable medium 502 includes instructions 514 that cause the processing resource 504 to determine that an application running in a container is to be updated. The determination may be performed based on a detection of presence of changes to an application code in a code storage location. The application code corresponds to the application.

The application may be, for example, the application 202 and the application code may be, for example, the application code 206. The code storage location may be, for example, a code repository, which is to receive a plurality of versions of the application code from a developer of the application or a persistent volume associated with the container. The code repository may be, for example, the code repository 228 and the persistent volume may be, for example, the PV 302. The code repository may be part of the repository node 512.

The non-transitory computer-readable medium 502 includes instructions 516 to retrieve the changes to the application code in response to the detection. Instead of the changes to the application code, the instructions 516 may cause retrieval of an updated version of the application code from the code storage location. The updated version includes the changes to the application code. The updated version may be, for example, the second version 226.

The non-transitory computer-readable medium 502 includes instructions 518 to update the application being hosted in the container based on the changes to the application code. For instance, the application running in the container may be updated such that it corresponds to the updated version, as explained with reference to FIGS. 1-3. The updating may involve restart of the container and/or restart of the application.

The container can be used to test a plurality of versions of application code prior to deployment of the application in a production environment. For instance, as explained earlier, the container 204 may be used to test the first version 224, the second version 226, the third version, and the like until the developer arrives at a finalized version of the application code. In an example, the instructions 514-518 may be part of a container image from which a container, such as the container hosting the application, can be instantiated. The container image may be, for example, the container image 108. Further, the instructions 514-518 may be provided in the form of a script.

The present subject matter prevents creation of a new container image based on changes to application code and instantiating a new container from the new container image. Therefore, the time consumed for testing the changes to the application code can be significantly reduced. Further, since the new container image is not to be transmitted for changes to the application code, the present subject matter significantly reduces the amount of data transferred across a network. For instance, for testing the changes to the application code, a new container image having the changed application code is not to be transmitted. Rather, the updated application code or the changes alone is to be transmitted. Thus, the present subject matter reduces the amount of network resources consumed for testing changes to application code.

Further, the inclusion of the instructions to retrieve application code/application code changes and update the application are provided as part of a container image provides for an improved container image for testing purposes. Such a container image can be used in any computing environment that is used to test changes to application code. Accordingly, the present subject matter provides an improved container image that can be used in a plug-and-play fashion by a developer for testing changes in the application code developed by the developer.

The present subject matter can be implemented without depending on a particular filesystem for propagating and applying changes to be tested. Therefore, the present subject matter is simple to implement. Further, the present subject matter reduces dependence on proprietary filesystems for testing application code changes, while also ensuring reduction in the amount of data to be transferred and the time consumed for development testing.

Further, the script in the container image can be customized according to the language using which the application code is written, the type of versioning control service, and the like, to ensure that the application can be updated based on the application code changes and can be tested. The present subject matter can be used for testing application codes written using various languages, such as Python, C, and C++.

Although implementations of updating of container-based applications have been described in language specific to structural features and/or methods, it is to be understood that the present subject matter is not necessarily limited to the specific features or methods described. Rather, the specific features and methods are disclosed and explained as example implementations.

We claim:

1. A system comprising:
a processor; and
a memory coupled to the processor and storing a container image that includes a first set of instructions executable by the processor and storing a second set of instructions, where a container is instantiable from the container image and the container is to host an application that corresponds to a first version of an application code,
wherein the first set of instructions, when executed by the processor, cause the processor to:
detect updates to a code storage location based on at least one of polling and receipt of an update notification;
retrieve application code changes from the code storage location in response to detection of the updates to the code storage location, the application code changes being a difference between the first version and a second version; and
update the application hosted in the container based on the retrieved application code changes;
wherein the second set of instructions, when executed by the processor, cause the processor to create a production container image corresponding to a production container to be deployed in a production environment, wherein the production container image comprises a final version of the application code corresponding to a final version of the application, and the production container image excludes the first set of instructions.

2. The system of claim 1, wherein the code storage location is one of a code repository that is to receive a plurality of versions of the application code from a developer of the application and a persistent volume associated with the container.

3. The system of claim 1, wherein the memory comprises a third set of instructions executable to:
request a repository node that is to receive a plurality of versions of the application code from a developer for the application code changes; and
store the application code changes in the code storage location.

4. The system of claim 1, wherein, to update the application hosted in the container, the first set of instructions are executable to perform at least one of:
restart of the application; and
restart of the container.

5. The system of claim 1, wherein in response to retrieving the application code changes, the first set of instructions is executable to build the second version based at least in part on the first version and the application code changes.

6. The system of claim 1, wherein the container is to test a plurality of versions of the application, each version of the application corresponding to a version of the application code, prior to deployment of the application in the production environment.

7. A method comprising:
detecting, by a processing resource, presence of an updated version of an application code in a repository node;
determining, by the processing resource, based on the detection, that an application hosted in a container is to be updated corresponding to the updated version of the application code;
requesting, by the processing resource, the repository node for the updated version of the application code;
receiving, by the processing resource, the updated version of the application code from the repository node;
updating, by the processing resource, the application hosted in the container based on the updated version of the application code, wherein the detecting, the determining, the requesting, the receiving, and the updating are performed by a processor executing a set of instructions that are part of a container image from which the container is instantiable; and
creating a production container image corresponding to a production container to be deployed in a production environment, wherein the production container image comprises a final version of the application code corresponding to a final version of the application, and the production container image excludes the set of instructions.

8. The method of claim 7, comprising detecting the presence of the updated version based on polling of the repository node.

9. The method of claim 7, comprising detecting the presence of the updated version in response to receipt of an update notification from the repository node.

10. The method of claim 7, wherein updating the application comprises at least one of:
restarting the application; and
restarting the container.

11. The method of claim 7, wherein the repository node comprises a code repository that is to store a plurality of versions of the application code.

12. The method of claim 7, wherein the container is to test a plurality of versions of the application, each version of the application corresponding to a version of the application code, prior to deployment of the application in the production environment.

13. A non-transitory computer-readable medium comprising instructions, the instructions being executable by a processing resource to:
determine that an application running in a container is to be updated, the determination being based on detection of presence of changes to an application code in a code storage location, wherein the application code corresponds to the application;
retrieve one of the changes to the application code and an updated version of the application code from the code storage location in response to the detection, the updated version comprising the changes to the application code; and
update the application being hosted in the container based on the retrieved one of the changes to the application code and the updated version of the application code; and
create a production container image corresponding to a production container to be deployed in a production environment,
wherein the production container image comprises a final version of the application code corresponding to a final version of the application,
the instructions that cause the processing resource to determine, to retrieve, and to update from a first set of instructions, and the first set of instructions are part of a container image from which the container is instantiable, and
the production container image excludes the first set of instructions.

14. The non-transitory computer-readable medium of claim 13, wherein the code storage location is one of a code repository that is to receive a plurality of versions of the application code from a developer of the application and a persistent volume associated with the container.

15. The non-transitory computer-readable medium of claim 13, wherein, to update the application being hosted in the container, the instructions are executable to perform at least one of:
 restart of the container; and
 restart of the application.

* * * * *